Patented Mar. 1, 1938

2,109,471

UNITED STATES PATENT OFFICE 2,109,471

ADHESIVE

Richard Gurley Drew, St. Paul, Minn., assignor to Minnesota Mining & Manufacturing Company, St. Paul, Minn., a corporation of Minnesota No Drawing. Original application July 27, 1925, Serial No. 46,492. Divided and this application June 16, 1926, Serial No. 116,473

1 Claim. (Cl. 134—23.1)

My present invention relates in general to adhesives or coatings, and more particularly to soluble adhesives or coatings, and specifically to a non-drying water-soluble adhesive or coating, and method of producing the same.

While the invention has a broad field of usefulness, I have found it of peculiar utility for producing an adhesive coating for limiting the application of the spray of liquid finishing material such, for example, as lacquers in automobile body paint shops, and I therefore find it convenient to describe the invention in connection with such practice and product, it being understood, however, that such limited fields of specific description are employed purely for purposes of illustration of an example of the utility of the invention in its several phases.

In the work referred to, my improved material may be used as an adhesive for holding protective paper aprons against surfaces on which it is not desired to apply the lacquer spray, such, for example, as glass windows, upholstery, rubber mats on running boards, bright metal parts, and the like.

My improved material may also be applied directly to a surface which is later on to be finished by an application of the lacquer spray or by painting, or to a surface which has been finished in order to prevent mingling of the colors, as, for example, in two-color work.

My improved material may further be applied to paper or other suitable backing, in the form of tape or such other form as may be appropriate for the purpose contemplated.

It is to be observed that in finishing automobile bodies with lacquers of a plurality of colors, difficulties are found in limiting the application of the colors, owing to diffusion of the spray. In order to attain a clear and clean cut line of demarcation between the several colors, adhesive tapes have been used. These are of two general types, of which the so-called zinc-oxide tape is an example of one type using a cloth backing and the ordinary gummed-paper tape is an example of the other type.

Both types of tape referred to present certain marked objections, among which may be noted that the zinc-oxide tape is not water-soluble and when it is removed, a residue remains which has to be cleared away by some expensive solvent such, for example, as benzine, gasoline, alcohol or the like, and the ordinary gummed paper tape adheres so tenaciously to the surface to which it is applied that it is necessary either to soak it in warm water, which involves delay or to scrape it off with a sharp instrument which tends to mar the underlying surface. If such underlying surface has been lacquered or painted, the danger of marring is obvious. Furthermore, in the case of the tapes referred to, it frequently happens in pulling away the tape from the object to which it has been applied, patches of the lacquer or paint coat will be lifted from the surface and come away with the tape. Again it frequently happens that these known tapes curl and become tangled in application and therefore difficult to manage and apply accurately. Similarly if not correctly applied in the first instance, they often cannot be removed and reapplied in the desired location as they are ruined for such purpose by removal. Likewise they are often so energetic in their adherent action that the treated coat must be allowed to set and become firm before the tape is applied thereto. In the cases of certain materials, such as leather and glass, the known tapes are objectionable either in that they will not readily adhere thereto, or if they are forced by pressure and time elements so to do, they are not readily cleansed therefrom, tending in the case of leather to enter into the pores thereof and in the case of glass to become diffused thereover, both of which adds to the cost of the operation or detracts from the results produced. It is known to those who are skilled in the art that both zinc-oxide cloth tape and gummed paper tape tend to deteriorate by the lapse of time owing to the drying out of the adhesive material, and consequent loss of its power to adhere to the object to which it is applied.

The principal objects of my present invention, therefore, are the provision of an adhesive or coating which is non-drying; the provision of an adhesive or coating which is water-soluble; the provision of adhesive or coating which is mild in its action; the provision of an adhesive or coating which may be applied to a lacquered, painted or varnished surface without injury thereto; the provision of an adhesive or coating that when applied to a lacquered, varnished or painted surface may be removed therefrom without injury thereto; the provision of an adhesive or coating that may be applied to leather or other porous material without infiltration thereinto; the provision of an adhesive or coating that may be applied to glass without diffusion thereon; the provision of an adherent coated backing having one or more of the foregoing characteristics; the provision of an adherent coated backing which is non-curling; the provision of an adherent coated backing which may be applied to an object, removed therefrom and reapplied without injury to the object or to itself; the provision of an adherent treated coating in which any residuum on removal is readily soluble in water; the provision of an adherent treated coating which is highly flexible and adapts itself to curved contours of the object to which it is applied; the provision of a new composition of matter for the purpose referred to; the provision of an improved method for producing the said composition, together with certain other objects which will hereinafter appear or be pointed out.

In attaining the foregoing objects and certain additional benefits and advantages to be below disclosed I have provided an improved adhesive or coating which, as above suggested, may be applied either as a spotting for protective paper aprons, may be applied directly to the object, or may be embodied in an article such as a tape, which not only avoids the disadvantages and objections incident to the use of zinc-oxide cloth tape and ordinary gummed paper tape, but combines their advantages and exhibits a number of additional marked advantages peculiar to itself.

Among these may be remarked that it will firmly adhere to the widest range of materials, and do so indefinitely; that after it has served its purpose it may be pulled away without soaking or scraping and without lifting or injuring the underlying coat; and that after removal any slight residuum may be removed from the object to which it has been applied by water at ordinary temperatures, quickly, safely and efficaciously.

As an example of its usefulness, it may be noted that in connection with the finishing of an automobile body in two colors by means of lacquer sprays, as soon as one lacquer color is applied, the tape may be applied up to the line where the color is to be changed, and then the other lacquer color applied. As soon as this last operation is completed the improved tape may be ripped off without harming the underlying lacquer, since the adhesive does not become sufficiently hard to so cement itself in position to cause that highly undesirable action. Should the tape happen to be misapplied and not properly located adjacent the line desired for color change, it can be readily removed and a second or even third attempt made until the exact boundary line desired is accurately established, and it is easily so applied inasmuch as it does not curl though it is extremely flexible and accommodates itself to curved contours. Because of its mildness in action, it may be promptly applied to a finished surface, and removed therefrom, and any residuum cleaned off by a sponge, without fear of injury to the finished surface. Furthermore it requires no special preparation for use, and as it remains fresh indefinitely no special care has to be taken to insure the use of fresh supplies.

In the preparation of the adhesive or coating according to the present preferred practice batches are formed which by weight contain the following ingredients, viz:

Part I

| | Pounds |
|---|---|
| Hide glue of high quality | 100 |
| Water | 100 |

The glue is soaked in the water until it swells, and then the mass is dissolved by heat in a steam jacketed kettle.

Part II

Glycerine (preferably water white C.P.) _ 400 lbs.

Parts I and II are both brought to a temperature about 140° F. to 150° F. and then mixed together and stirred thoroughly to produce a homogeneous mass.

Part III

| | Pounds |
|---|---|
| Calcium chloride (commercial 75% pure) | 37 |
| Water | 37 |

The calcium chloride is dissolved in the water, and Part III is then added to the combination of Parts I and II and thoroughly commingled therewith.

Part IV

Beta naphtha in alcohol (1% solution) 1/125 part. Part IV is then added to the combination of Parts I, II and III.

Briefly stated, the functions of the several elements in the foregoing composition are as follows: glycerine is added to the adhesive glue for the purpose of imparting flexibility thereto and maintaining such flexibility; calcium chloride is added because of its hygroscopic qualities in order to prevent the adhesive from drying out, it having been found that normally such addition will preserve the desired degree of adhesiveness under ordinary conditions of temperature and humidity; and the beta naphthol solution in alcohol is added as a precautionary disinfectant to inhibit the growth of mould or other fouling.

For certain purposes, such as the combination of high temperature and high humidity conditions, I find it at times desirable to add a small percentage of alum, (e. g., 5% to 1% of alum on the dry glue, by weight) which tends to coagulate the glue and impart to it an arbitrary body, limiting the amount of water absorbed from the atmosphere, and thereby avoiding any undue or excessive amount of stickiness in the resultant product.

When embodying my present invention in the form of a tape. I preferably pre-size the cellulose or paper backing on the surface to which the coating or adhesive is to be applied, in order to limit the penetration thereof and thereby economize in the amount of such coating required for the production of a given quantity of tape. My preferred material for such pre-sizing is a ten per cent (10%) solution of hide glue in water.

For certain special purposes, such as more closely determining the amount of penetration, or of making a stronger tape, or both, I have employed other methods of preparing the tape which I will now proceed to describe.

In the case of a 30# sheet, I apply a thin coating of asphaltum, and before the asphaltum coat has set, a thin tissue sheet of, say, 12# stock is applied to the asphaltum coat, thus making a three-ply laminated structure. My improved coating or adhesive is then applied to the tissue paper and obviously can penetrate no further than to the asphaltum coating.

Again, I have applied to a 30# sheet a thin coating of asphaltum and before the asphaltum has set, further applied to the asphaltum coated surface a sheet of reticulated fabric such as is analogous to mosquito netting or a loosely woven cheese-cloth.

In the latter case, the product is not only materially strengthened, but the need of using anything in the nature of a slip-sheet to prevent the tape from adhering together as it is wound into coils is obviated.

In the actual practice with adhesive thus far employed by me for the purposes of my present invention, I have thus far had the best results with hide glue as set forth in the foregoing formula. I have, however, had results not so satisfactory with other adhesives such as casein, dextrin, starch, blood albumen, and various water-soluble gums such as acacia, tragacanth, etc.

The preferred material, hide glue and those herein enumerated, to a certain extent are desirable in that they form, with a proper moistening agent a "gelatinous adhesive material" and in the claim I mean to include by such term, materials of the character referred to which, in association with a moistening material, have a gelled and adhesive consistency.

I have also employed other modifying agents for the purpose of imparting flexibility to the composition. Among these may be mentioned sulphonated castor-oil, which though it may render the product too tenaciously adhesive for use on lacquered, varnished or painted surfaces, is most excellent for use in connection with tapes for closing packages.

I have also employed other sticky substances which are not only more or less adhesive but also more or less hygroscopic, in the production of a non-drying water-soluble adhesive or coating. Among these may be mentioned molasses, glucose, honey, and sugar, but thus far I have attained the best results with the composition as hereinabove set forth in the preferred formula.

While I have described my improved adhesive or coating in connection with tape for a particular purpose, it will be appreciated that it has a wide field of utility for closing packages, for holding display sheets against sheet glass, and for various uses which may be either temporary, as hereinabove set forth, or permanent relatively as where ordinary gummed tape is not used.

My improved adhesive or coating may also be used for applying to various surfaces designs in color, ranging from the simplest to the most complex, either by using it in the form of a paint or of a piece or pieces of stencilling material, by a method which includes, for example, applying my improved coating, applying a permanent coating thereabout, washing off the first mentioned coating, applying my improved coating to the second mentioned coating, and then applying a permanent coating to the desired space covered in the first instance by my said coating.

One of the marked advantages of adhesives or coatings forming the subject matter of my present invention is the inertness thereof in respect to acetone, amyl acetate and other solvents of nitro-cellulose, which renders them of peculiar availability in connection with finishing operations wherein nitro-cellulose or compounds of nitro-cellulose and gum varnishes are employed.

This application is a division of my prior application, Serial No. 46,492, filed July 27, 1925.

Having thus described my invention and illustrated its use, what I claim as new and desire to secure by Letters Patent is:

For use with a normal pressure sensitive sheeted binder coating an adhesive including 100 parts of glue, 400 parts of glycerine, and 37 parts of calcium chloride, by weight, the residuum whereof is non-drying and water soluble.

RICHARD GURLEY DREW.